US012434414B2

(12) United States Patent
Pucci et al.

(10) Patent No.: US 12,434,414 B2
(45) Date of Patent: Oct. 7, 2025

(54) APPARATUS FOR MAKING OBJECTS BY MEANS OF COMPRESSION MOULDING

(71) Applicant: SACMI COOPERATIVA MECCANICI IMOLA SOCIETA' COOPERATIVA, Imola (IT)

(72) Inventors: Fabrizio Pucci, Castel Guelfo di Bologna (IT); Fiorenzo Parrinello, Medicina (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 122 days.

(21) Appl. No.: 17/997,560

(22) PCT Filed: May 6, 2021

(86) PCT No.: PCT/IB2021/053859
§ 371 (c)(1),
(2) Date: Oct. 31, 2022

(87) PCT Pub. No.: WO2021/224860
PCT Pub. Date: Nov. 11, 2021

(65) Prior Publication Data
US 2023/0219264 A1      Jul. 13, 2023

(30) Foreign Application Priority Data
May 6, 2020   (IT) .................. 102020000010039

(51) Int. Cl.
*B29C 43/52*      (2006.01)
*B29C 35/08*      (2006.01)
(Continued)

(52) U.S. Cl.
CPC .......... *B29C 43/52* (2013.01); *B29C 35/0805* (2013.01); *B29C 43/08* (2013.01);
(Continued)

(58) Field of Classification Search
None
See application file for complete search history.

(56) References Cited

U.S. PATENT DOCUMENTS

| 5,401,154 A | 3/1995 | Sargent |
| 8,863,805 B2 | 10/2014 | Naumann |

(Continued)

FOREIGN PATENT DOCUMENTS

| CN | 1886241 A | 12/2006 |
| CN | 101300118 A | 11/2008 |

(Continued)

OTHER PUBLICATIONS

Japanese Office Action with English translation of corresponding Japanese Patent Application No. 2024-120762 dated Jul. 15, 2025, 11 pages.

*Primary Examiner* — Joseph S Del Sole
(74) *Attorney, Agent, or Firm* — Chrisman Gallo Tochtrop LLC (57) ABSTRACT

An apparatus for forming an object comprises an extruding device (2) for supplying a continuous extrudate of polymeric material, at least one separating element for cutting the continuous extrudate thereby separating a dose (6; 106) of polymeric material from the continuous extrudate, at least one mould (5; 105; 205; 305; 405) comprising a first mould part (9; 109; 209; 309) and a second mould part (8; 108; 508) which are movable relative to one another between an open position, in which the dose (6; 106) is rested on a receiving part selected from the first mould part (9; 109; 209; 309) and the second mould part (8; 108; 508), and a closed position, in which a forming chamber is defined between the first mould part (9; 109; 209; 309) and the second mould part (8; 108; 508), the forming chamber having a shape corresponding to said object. The apparatus further comprises a thermal conditioning device (11; 111; 211; 311; 411) configured to (Continued)

act on the dose (6; 106) while the dose (6; 106) is positioned in said at least one mould (5; 105; 205; 305; 405) and before the closed position is reached, by thermally conditioning at least one surface portion (20; 120) of the dose (6; 106) which is distinct from a resting portion (17; 117) of the dose (6; 106) which is resting on the receiving part.

15 Claims, 4 Drawing Sheets

(51) Int. Cl.
    *B29C 43/08*     (2006.01)
    *B29C 43/34*     (2006.01)
    *B29C 48/00*     (2019.01)

(52) U.S. Cl.
    CPC .......... *B29C 43/34* (2013.01); *B29C 48/0011* (2019.02); *B29C 48/0022* (2019.02); *B29C 2035/0838* (2013.01); *B29C 2043/3466* (2013.01); *B29C 2043/525* (2013.01)

(56) References Cited

U.S. PATENT DOCUMENTS

| | | |
|---|---|---|
| 2003/0198708 A1 | 10/2003 | Pucci |
| 2016/0001510 A1* | 1/2016 | Ono ........................ B29C 43/18 |
| | | 264/511 |
| 2019/0381716 A1 | 12/2019 | Parrinello et al. |

FOREIGN PATENT DOCUMENTS

| | | | |
|---|---|---|---|
| EP | 1777245 A1 | 4/2007 | |
| JP | 2005528245 A | 9/2005 | |
| JP | 2006264138 A | 10/2006 | |
| JP | 2007216531 A | 8/2007 | |
| JP | 2007296693 A | 11/2007 | |
| JP | 2012517366 A | 8/2012 | |
| JP | 2014138993 A | 7/2014 | |
| WO | 2003/090990 A1 | 11/2003 | |
| WO | 2006/016683 A1 | 2/2006 | |
| WO | WO-2020075020 A1 * | 4/2020 | ........... B29C 31/048 |

* cited by examiner

APPARATUS FOR MAKING OBJECTS BY MEANS OF COMPRESSION MOULDING

The invention relates to an apparatus and a method for making objects, for example containers, caps, preforms for containers, or other objects, by means of compression moulding of polymeric materials.

Apparatuses are known for making objects by means of compression moulding of a polymeric material. The known apparatuses comprise an extruder for supplying a continuous extrudate of polymeric material and a transport carousel which supports a plurality of transport elements. Each transport element has a cutting edge suitable for interacting with the continuous extrudate which comes out of the extruder. More specifically, when the transport element passes near the extruder, the cutting edge separates from the continuous extrudate a dose of polymeric material in the melted state. The dose is then collected by the transport element and conveyed by the latter until it arrives near a mould. At this point, the transport element releases the dose into the mould, so that it can be shaped between a male part and a female part of the mould in order to form a desired object.

While the dose is conveyed by the transport element, the portion of the dose which is in contact with the transport element cools more than the remaining parts of the dose. The portion of dose which, due to contact with the transport element, cooled more rapidly, originates on the moulded object a spot in which the moulded object has aesthetic and optical properties which are different compared with the surrounding regions. This spot is clearly visible and unwanted, since it worsens the appearance of the moulded object.

Defects may occur on the moulded object also at the portions of polymeric material which interacted with the cutting edge, by means of which the dose is separated from the continuous extrudate which comes out of the extruder. The cutting edge, in addition to cooling the portions of polymeric material on which it acts, creates on the dose edges in which little polymeric material is present. Those edges rapidly cool until they almost solidify and create a lack of uniformity in the behaviour of the polymeric material when the dose is compressed between the male part and the female part of the mould. Consequently, there are areas lacking homogeneity in the moulded object.

The portions of polymeric material which have been cooled prematurely during the cutting and/or conveying of the dose may cause on the moulded object zones in which the polymeric material is weakly joined to the surrounding polymeric material due to its relatively low temperature (known as "cold sealing zones"). Those zones may constitute breakage trigger points during the subsequent processes to which the moulded object is subjected, or during the life of the object itself. If for example the moulded object is a preform, breaks may occur either during the blow moulding process by means of which the preform is converted into a bottle, or in the event of accidental impacts or dropping of the bottle.

Examples of prior art apparatuses for producing objects at least partly made of polymeric material are disclosed in US 2003/0198708, U.S. Pat. No. 5,401,154 and US 2016/0001510.

An object of the invention is to improve the apparatuses and the methods for making objects by means of compression moulding of a polymeric material.

A further object is to provide an apparatus and a method which allow a compression moulded object to be obtained having properties which are as homogeneous as possible.

Another object is to provide an apparatus and a method which allow a good quality object to be made, even in terms of its appearance, by means of compression moulding of a polymeric material.

A further object is to provide an apparatus and a method for making an object by means of compression moulding of a polymeric material, in which the formed object is substantially free of defects, such as visible spots or cold sealing zones, which are due to non-homogeneous cooling of the polymeric material during the operations to which the polymeric material has been subjected before being inserted into the mould.

In a first aspect of the invention, there is provided an apparatus for forming an object, comprising an extruding device for supplying a continuous extrudate of polymeric material, at least one separating element for cutting the continuous extrudate thereby separating from the continuous extrudate a dose of polymeric material, at least one mould comprising a first mould part and a second mould part which are movable relative to one another between an open position, in which the dose is rested on a receiving part selected from the first mould part and the second mould part, and a closed position, in which a forming chamber is defined between the first mould part and the second mould part, the forming chamber having a shape corresponding to said object, wherein the apparatus further comprises a thermal conditioning device arranged to act on the dose while the dose is arranged in said at least one mould and before the closed position is reached, by thermally conditioning at least a surface portion of the dose which is distinct from a resting portion of the dose which is resting on the receiving part.

The thermal conditioning device may act on a surface portion of the dose which cooled while the dose was being separated from the continuous extrudate and/or while the dose was being conveyed towards the mould. The temperature of this surface portion of the dose may thereby be returned to a value close to the temperature that the polymeric material has in the remaining portions of the dose. That allows the temperature distribution in the dose to be rendered relatively homogeneous, which improves the quality of the formed object. In particular, it is possible to prevent the presence on the formed objects of spots due to premature cooling of a surface portion of the dose during cutting and/or conveying, or at least to render such spots much less visible than in the prior art.

It is also possible to prevent, or at least to limit, the presence on the moulded object of cold sealing zones which could subsequently constitute breakage trigger points.

The heat transferred to the surface portion of the dose by the thermal conditioning device allows local softening of the dose, until the dose melts or until it almost melts. In this way, any portions of the dose which solidified while the dose was being separated from the continuous extrudate and/or conveyed towards the mould, can be returned to a viscosity condition similar to that of the adjacent portions. This allows the dose to flow homogeneously in the forming cavity for forming the desired object. Consequently, the object which is formed by compression moulding the dose has relatively homogeneous properties.

The thermal conditioning device is arranged outside the receiving part.

This allows heating mainly of the surface portion of the dose which is not resting on the receiving part, that is to say, the surface portion of the dose which is exposed to the air when the dose is resting on the receiving part. That portion is usually the portion which cooled the most while the dose was separated from the continuous extrudate and/or conveyed towards the mould, because it was in contact with mechanical components of the apparatus before the dose was released onto the receiving part.

In one embodiment, the apparatus comprises a movement device for displacing the mould along a path, the closed position being reachable by the mould downstream of the open position along said path.

The path of the mould may be a closed loop, for example circular.

In an alternative embodiment, the path of the mould may be linear, for example straight.

In one embodiment, the thermal conditioning device comprises a containment structure, arranged in a zone of the path of the mould interposed between the open position and the closed position, for limiting heat dispersion towards the outside.

Owing to the containment structure, the heat remains confined near the mould, while the latter is in the open position. This allows to avoid cooling of the dose which has been released onto the receiving part of the mould and which will soon be shaped between the first mould part and the second mould part.

In one embodiment, the containment structure is heatable only with the heat released by the mould parts and by the doses which pass through it. Specific heating elements are not provided for heating the containment structure, which therefore defines a passive thermal conditioning device.

In this case, the thermal conditioning device is particularly simple and its energy consumption is very low.

In one embodiment, the thermal conditioning device comprises a heating element for heating the air inside the containment structure.

The heating element may be a source for emitting hot air, or a laser source, or a plasma source, or one or more infrared lamps, or other.

This allows an increase in the thermal effectiveness of the containment structure, if the heat released by the mould parts and by the doses which pass inside it is not sufficient.

In one embodiment, the thermal conditioning device is a heating device configured to emit heat in order to heat the surface portion of the dose.

The heating device allows effective heating of a predetermined surface portion of the dose.

The heating device may be configured to direct the thermal energy to a precise position of the surface portion of the dose.

A heating device of this type is useful when one knows with a good degree of precision the position in which the dose has been cooled the most during cutting and/or conveying and consequently it is possible to direct the energy to that position.

In one embodiment, the heating device may comprise a laser source configured to emit a laser beam which may be displaced along the surface portion for heating the latter.

This allows the laser beam to be moved along a surface portion having any desired shape, so as to take into account the shape of the dose and the imprint created on it by the components of the apparatus with which the dose came into contact before being positioned on the receiving part of the mould.

In one embodiment, the first mould part may comprise a male mould part.

The second mould part may comprise a female mould part.

In a second aspect of the invention, there is provided a method for forming an object, comprising the steps of:
supplying a continuous extrudate of polymeric material,
cutting the continuous extrudate, thereby separating therefrom a dose of polymeric material,
providing at least one mould comprising a first mould part and a second mould part;
positioning the dose on a receiving part selected from the first mould part and the second mould part while the first mould part and the second mould part are at a distance from each other;
moving the first mould part and the second mould part relative to each other until a closed position is reached, in which a forming chamber is defined between the first mould part and the second mould, the forming chamber having a shape corresponding to said object,
wherein, before reaching the closed position, there is provided thermally conditioning at least one surface portion of the dose which is distinct from a resting portion of the dose which is resting on the receiving part.

The method provided by the second aspect of the invention allows the obtainment of the advantages previously described with reference to the apparatus according to the first aspect of the invention.

In one embodiment, the surface portion of the dose which is thermally conditioned is a portion which interacted with a separating element during the step of cutting the continuous extrudate for separating the dose therefrom.

In one embodiment, the surface portion of the dose which is thermally conditioned is a portion which interacted with a transport element during a step of conveying the dose towards the mould, after the step of cutting the continuous extrudate.

In a third aspect of the invention, there is provided an apparatus for forming an object, comprising an extruding device for supplying a continuous extrudate of polymeric material, at least one separating element for cutting the continuous extrudate separating therefrom a dose of polymeric material, at least one mould comprising a first mould part and a second mould part which are movable relative to one another between an open position, in which the dose is rested on a receiving part selected from the first mould part and the second mould part, and a closed position, in which a forming chamber is defined between the first mould part and the second mould part, the forming chamber having a shape corresponding to said object, wherein the apparatus further comprises a localized heat source for directing thermal energy onto a selected portion of the dose before the dose is deformed between first mould part and the second mould part.

Owing to the third aspect of the invention, it is possible to make the temperature distribution inside the dose more homogeneous.

In one embodiment, the apparatus comprises at least one transport element movable along a trajectory for conveying the dose towards the mould.

The localized heat source is positioned at a point of that trajectory.

This allows heat to be transferred to the dose while the dose is conveyed towards the mould.

In one embodiment, the localized heat source is positioned in such a way as to transfer heat to the dose while the dose is falling onto the receiving part.

In a fourth aspect of the invention, there is provided a method for forming an object, comprising the steps of:
supplying a continuous extrudate of polymeric material, cutting the continuous extrudate, separating a dose of polymeric material therefrom, providing at least one mould comprising a first mould part and a second mould part;

positioning the dose on a receiving part selected from the first mould part and the second mould part, while the first mould part and the second mould part are at a distance from each other;

moving the first mould part and the second mould part relative to each other until a closed position is reached, in which a forming chamber is defined between the first mould part and the second mould part, the forming chamber having a shape corresponding to said object, wherein, before reaching the closed position, thermal energy emitted by a localized heat source is directed onto a surface portion of the dose.

The method according to the fourth aspect of the invention allows the obtainment of the advantages previously described with reference to the third aspect of the invention.

Figure 1:
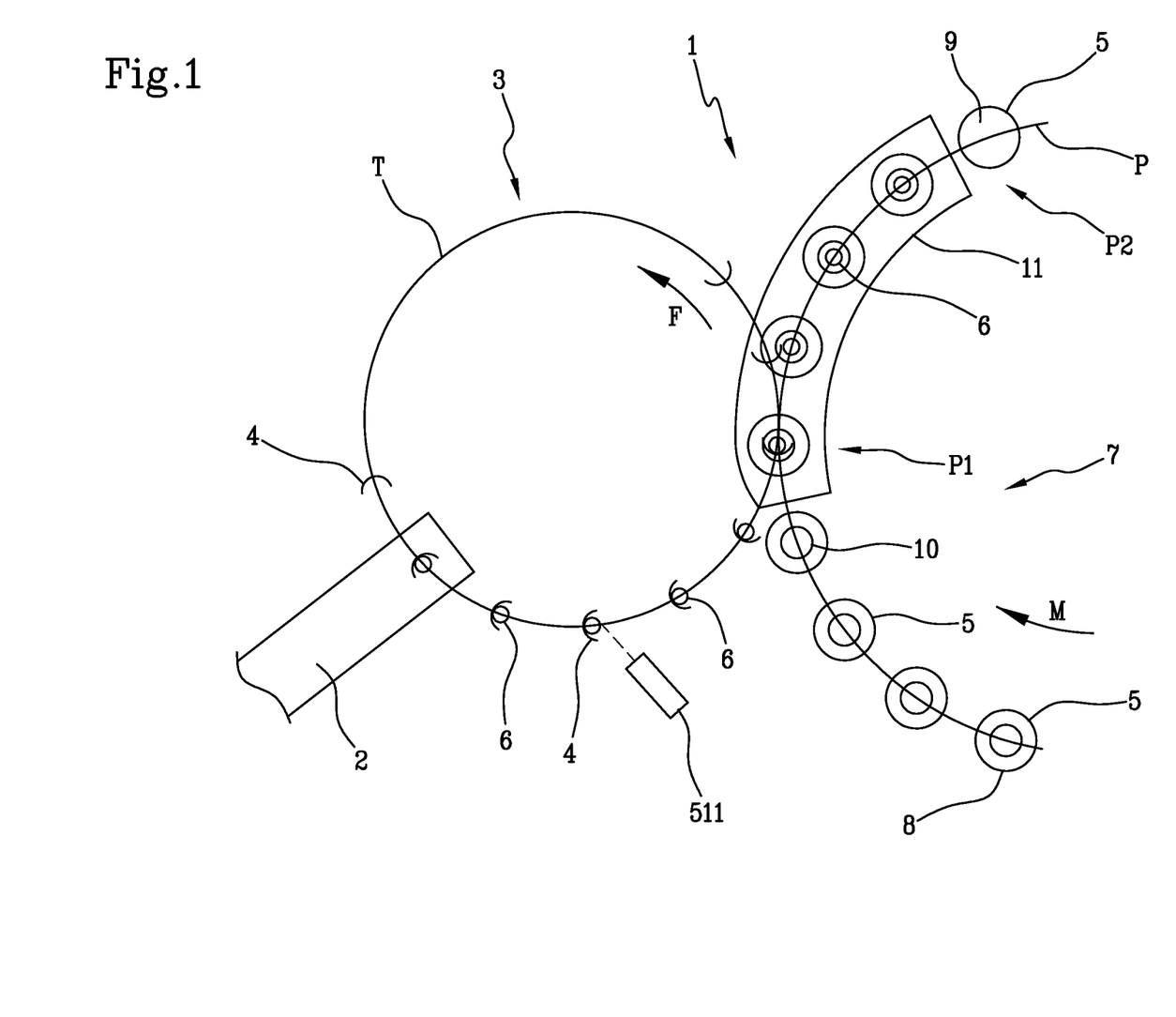
FIG. 1 is a schematic top view, showing a portion of an apparatus for making objects by means of compression moulding.

The invention can be better understood and implemented with reference to the accompanying drawings, which illustrate several example, non-limiting embodiments thereof, in which:

FIG. 1 shows an apparatus 1 for making objects by means of compression moulding of a polymeric material. The objects that the apparatus 1 allows to be obtained may be concave objects such as containers, caps for containers, preforms for containers, capsules for coffee or for other powdered substances, or also other types of objects.

The apparatus 1 comprises an extruding device 2, suitable for supplying a continuous extrudate of polymeric material. In the example shown, the polymeric material comes out of the extruding device 2 along a substantially vertical outfeed direction, from the top downwards, but other outfeed directions are possible. For example, the polymeric material could come out of the extruding device 2 along a substantially vertical outfeed direction, from the bottom upwards, or along an outfeed direction inclined relative to the vertical.

The extruding device 2 may be configured for supplying a continuous extrudate having a single-layer structure, that is to say, made of a single polymeric material, or alternatively for supplying a multi-layer extrudate, that is to say, comprising at least two layers of polymeric materials which are different from each other.

The apparatus 1 further comprises at least one separating element, not visible in detain in the Figures, arranged for periodically passing near an outlet of the extruding device 2 and for cutting the continuous extrudate which comes out of the extrusion outlet. In this way, the separating element separates from the continuous extrudate a dose 6 of polymeric material, that is to say, a predetermined mass of polymeric material from which it is possible to obtain an object by means of compression moulding. In the example shown in FIG. 1, the dose 6 may have a shape that is approximately spherical, parallelepipedal or cylindrical. However, other shapes are possible for the dose 6.

The apparatus 1 further comprises a transport device 3, which includes at least one transport element 4 for conveying the dose 6. In the example shown, there is provided a plurality of transport elements 4, only some of which have been schematically shown in FIG. 1. The transport device 3 may therefore comprise a transport carousel.

The transport elements 4 are movable along a trajectory T which, in the example shown, is circular. However, this condition is not necessary, and the trajectory T could be a generic trajectory in the form of a closed loop, having at least one non-circular stretch.

In the example shown, each transport element 4 has a concave shape, for example like a "C" or a "U", with a concavity facing forwards relative to an advancement direction F of the transport elements 4.

Each transport element 4 has a cutting edge, which in the example shown is an upper edge of the transport element 4. As it passes near the outlet of the extruding device 2, the cutting edge separates the dose 6 from the continuous extrudate. Therefore, in this case, the cutting edge of the transport element 4 acts like a separating element for separating the dose 6 from the continuous extrudate. Then the dose 6 is received in the concavity of the transport element 4. The inside of this concavity is delimited by a transport surface to which the dose 6, which is still in a melted state, can adhere owing to its viscosity.

The apparatus 1 further comprises at least one mould 5 for compression moulding the dose 6, making the desired object from it by means of compression moulding. In the example shown, there is provided a plurality of moulds 5 mounted in a peripheral region of a moulding carousel 7, even if this condition is not necessary. FIG. 1 schematically shows only a portion of the moulding carousel 7.

Each mould 5 comprises a first mould part or male mould part 9 and a second mould part or female mould part 8, which are aligned with each other along a moulding direction which, in the example shown, is vertical. The female part 8 has a cavity 10, whilst the male part 9 is provided with a punch.

The female part 8 and the male part 9 are movable relative to each other owing to an actuator device which is not shown, between an open position P1 and a closed position P2. In the open position P1, the female part 8 and the male part 9 are at a distance from each other, so that it is possible to insert into the mould 5 a dose 6, for example conveyed by the transport element 4. In the closed position P2, the female part 8 and the male part 9 are near each other, so that a forming chamber is defined therebetween, the forming chamber having a shape corresponding to the object to be obtained.

In the example shown in FIG. 1, the female part 8 is positioned below the male part 9. The dose 6 is released by the transport element 4 when the latter is vertically aligned with a mould 5. Therefore the dose 6 falls into the underlying cavity 10 of the female part 8.

In this example, the female part 8 is therefore the receiving part, that is to say, the part of the mould which receives the dose 6 to be shaped. However, this condition is not necessary because, as will be described in more detail below, the receiving part could be the male part 9.

The dose 6 is inserted into the mould 5 while the latter is in the open position P1. Then, the female part 8 and the male part 9 begin moving towards each other and the dose 6 is shaped between the female part 8 and the male part 9, until the closed position P2 is reached, in which the dose 6 has been shaped into a desired shape. The mould 5 remains in the closed position P2 for a predetermined period of time, in order to cool the formed object until it reaches a temperature at which the formed object can be handled without being damaged. At this point, the female part 8 and the male part 9 move away from each other until the open position P1 is reached again. In the open position P1, it is possible to remove the formed object from the mould 5 and insert a new dose 6 into the mould 5, so as to repeat the moulding cycle.

The apparatus 1 further comprises a movement device for moving the moulds 5 along a path P, which in the example shown is circular, even if this condition is not necessary. Each mould 5 reaches the open position P1 at a predetermined point of the path P. Each mould 5 furthermore reaches the closed position P2 at a further predetermined point of the path P, arranged downstream of the point at which the open position P1 is reached relative to a movement direction M of the mould 5 along the path P.

Figure 2:
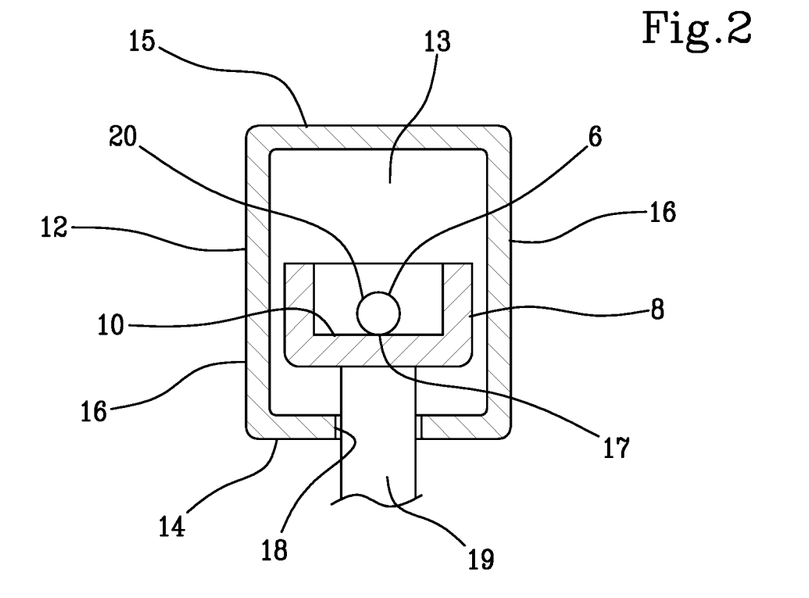
FIG. 2 is a schematic cross-section, showing a female mould part of the apparatus of FIG. 1, inside a containment structure.

The apparatus 1 further comprises a thermal conditioning device 11 configured to thermally condition the dose 6 after the dose 6 has been inserted into the mould 5 and more precisely while the dose 6 is resting on the receiving part of the mould 5, that is to say—in the example shown in FIGS. 1 and 2—while the dose 6 is resting on the female part 8.

The thermal conditioning device 11 is in particular configured to act on the dose 6 while the mould 5 in which the dose 6 is inserted is between the point of the path P at which the open position P1 is reached and the further point of the path P at which the closed position P2 is reached. In other words, the thermal conditioning device 11 is configured to thermally condition the dose 6 before the mould 5 reaches the closed position P2.

In the example considered, as shown in more detail in FIG. 2, the thermal conditioning device 11 comprises a containment structure 12 which at least partly encloses at least the receiving part of the mould 5 which is conveying the dose 6, that is to say, at least the female part 8 in which the cavity 10 is made.

The containment structure 12 comprises a plurality of walls which define a thermally conditioned space 13 inside which the female part 8 moves the dose 6, by moving along the path P. For example, in the embodiment shown in FIG. 2, the containment structure 12 comprises a lower wall 14 positioned below the cavity 10, an upper wall 15 positioned above the female part 8 and two lateral walls 16 interposed between the lower wall 14 and the upper wall 15. The containment structure 12 may therefore have a tubular shape, which encloses at least a part of the path P of the moulds 5. In the example shown, in which the path P is circular, in plan view the containment structure 12 has the shape of an arc of a circle. The containment structure 12 has an entrance opening, through which the female parts 8 of the moulds can enter the containment structure 12 near the point at which each female part 8 receives the dose 6. The containment structure 12 furthermore has an exit opening, through which the female parts 8 can come out of the containment structure 12 near the point of the path P at which the closed position P2 is reached.

As shown in FIG. 2, the containment structure 12 has a passage 18 through which a rod 19 which supports the female part 8 of the mould 5 can pass.

The containment structure 12 has the function of maintaining a relatively high temperature along the stretch of the path P in which the dose 6 has already been released into the mould 5 and has not yet been completely shaped. That happens because the containment structure 12 prevents or in any case limits heat dispersion outside itself. The air present in the containment structure 12 is kept relatively hot by the heat transferred from the doses 6 resting on the corresponding female parts 8 which pass inside the containment structure 12.

In one embodiment, the female parts 8 of the moulds 5 are thermally conditioned in such a way that they have a relatively high temperature. In this case, the air present in the containment structure 12 is continuously heated also by the female parts 8 of the moulds 5 which, along a stretch of the path P, pass inside the containment structure 12.

In an alternative embodiment, the female parts 8 of the moulds 5 may be thermally conditioned in such a way that they have a relatively low temperature. In this case, the contribution that the female parts 8 of the moulds 5 give to heating the air present in the containment structure 12 is negligible.

In an alternative embodiment not illustrated, the containment structure 12 may comprise a smaller number of walls than in the example shown in FIG. 2. The containment structure 12 could for example be without the upper wall 15, in which case the containment structure 12 would be of very simple construction, although limiting heat dispersion towards the outside. In the example shown in FIGS. 1 and 2, the thermal conditioning device 11 is of the passive type, that is to say, it uses the heat released by the doses 6 and by some components (if any) of the apparatus 1, such as the female parts 8, to keep the temperature in the containment structure 12 relatively high. A heating element may also be provided for actively heating the air inside the containment structure 12. The active heating element could comprise, for example, a hot air source, or a laser source, or a plasma-type heating element, or other. The active heating element could comprise one or more infrared ray lamps positioned inside the containment structure 12. One or more reflective mirrors could be provided on the walls of the containment structure 12 for directing the infrared rays towards the dose 6.

During operation, the extruding device 2 supplies a continuous extrudate of polymeric material. Each transport element 4 passes near the outlet of the extruding device 2 and cuts the continuous extrudate, separating the dose 6 from it. The transport element 4 moves the dose 6 along the trajectory T until it reaches a position in which the transport element 4 is interposed between the female part 8 and the male part 9 of a mould 5. At this point, the dose 6 is released by the transport element 4 and falls into the underlying cavity 10 of the female part 8. In this way the dose 6 is rested on the female part 8 at a resting portion 17 of the dose 6. The corresponding mould 5 is in the open position P1.

The female part 8 in whose cavity 10 the dose 6 has been deposited is moved along the path P thereby passing through the containment structure 12. The air present in the containment structure 12 keeps the dose 6 relatively hot, preventing the dose 6 from cooling or increasing the surface temperature of the dose 6. In particular, the air present in the containment structure 12 acts on a surface portion 20 of the dose 6 which is distinct from the resting portion 17 of the dose 6 which is resting on the female part 8, that is to say, on a surface portion 20 of the dose 6 exposed to the air.

This heats any portions of the surface of the dose 6 which cooled before the dose 6 was deposited in the mould 5, for example due to interaction between the dose 6 and the cutting edge of the transport element 4 which separated the dose 6 from the extruder 2, or between the dose 6 and the transport surface of the transport element 4 with which the dose 6 came into contact while the dose 6 was brought towards the mould 5.

Consequently, when the mould 5 is brought into the closed position P2 and the dose 6 is pressed between the female part 8 and the male part 9, the dose 6 has a relatively homogeneous temperature. That allows the polymeric material of which the dose 6 is constituted to easily flow between the female part 8 and the male part 9, thereby originating a good quality moulded object.

In particular, this avoids the formation of spots on the surface of the moulded object, or trigger points for breakage, which are caused by premature cooling of parts of the dose 6 which have come into contact with the cutting edge and/or with the transport surface of the transport element 4. Indeed, the parts of the dose 6 which have been prematurely cooled during cutting and/or conveying of the dose 6 are heated again while the dose 6 passes in the containment structure 12, which allows the obtainment of a relatively homogeneous temperature distribution on the surface of the dose 6, as well as between the surface of the dose 6 and the core of the dose 6, which is naturally hotter than its surface.

Figure 3:
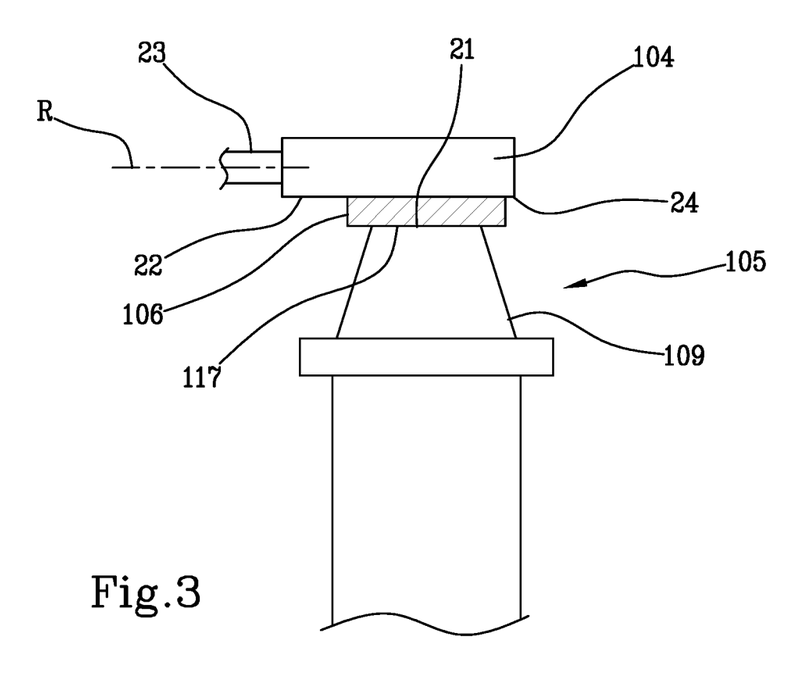
FIG. 3 is a schematic view, showing a male mould part onto which a transport element is releasing a dose of polymeric material, in an alternative embodiment of the apparatus of FIG. 1.
Figure 4:
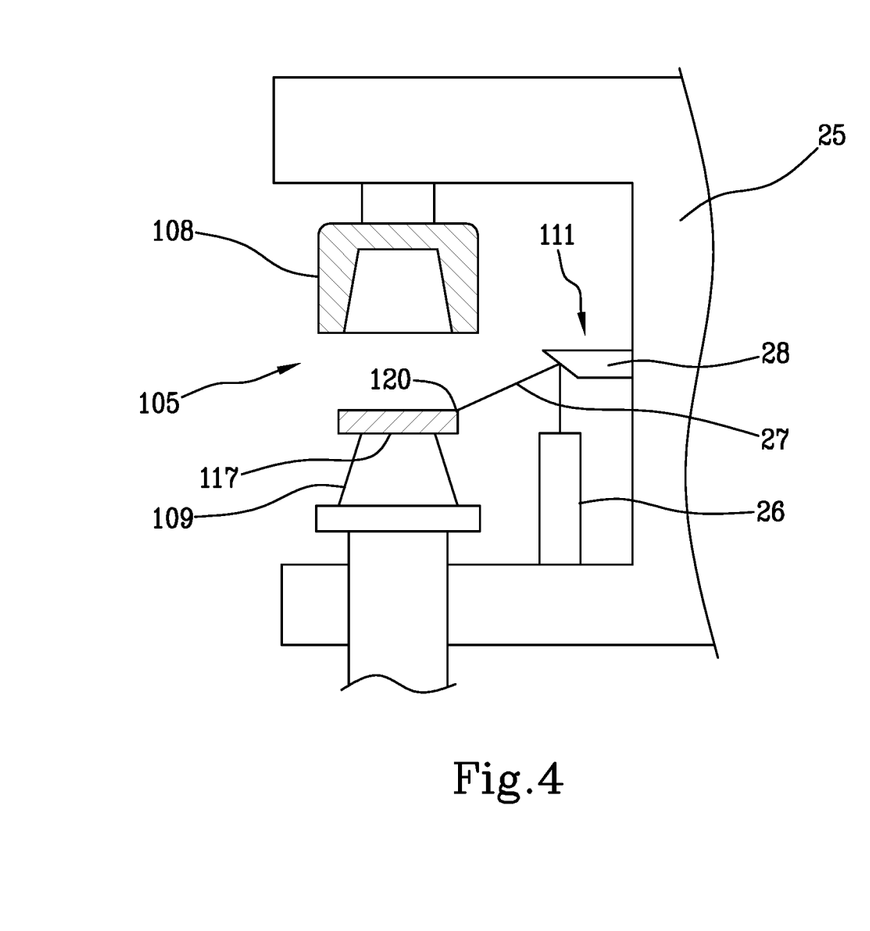
FIG. 4 is a schematic view like that of FIG. 3, showing a heating element for heating the dose.

FIGS. 3 and 4 schematically illustrate a mould 105 of an apparatus for making objects by means of compression moulding according to an alternative embodiment.

The mould 105 shown in FIGS. 3 and 4 differs from the mould 5 shown in FIGS. 1 and 2 mainly because it comprises a male part 109 positioned below the female part 108. The male part 109 is aligned with the female part 108 along a moulding direction which, in the example shown, is vertical. Therefore, in this embodiment, the male part 109 acts as receiving part on which a dose 106 is deposited.

More specifically, the male part 109 is delimited, in an upper region thereof, by a receiving surface 21 on which the dose 106 is intended to be rested. In more detail, the dose 106 is intended to be rested on the male part 109 at a resting portion 117 of the dose 106. In the example shown, the receiving surface 21 is substantially flat, but other geometries are possible for the receiving surface 21.

The apparatus in which the mould 105 is included comprises, as already described with reference to the apparatus 1 shown in FIGS. 1 and 2, an extruder arranged for supplying a continuous structure which may be made of a single material or multi-layered. The extruder has a rectangular outlet, so that the continuous structure has the shape of a thin sheet from which it is possible to separate doses 106 which are substantially parallelepipeds or cubic. As can be seen in FIGS. 3 and 4, the dose 106 is delimited by a pair of larger faces, each of which may be rectangular or square. One of the two larger faces is intended to be rested on the receiving surface 21, whilst the other larger face, opposite that which is intended to rest on the receiving surface 21, is arranged for coming into contact with a transport element 104 having the function of conveying the dose 106 from the extruder towards the mould 105.

The distance between the larger faces of the dose 106 defines a thickness of the dose 106. In the example shown, the thickness of the dose 106 is less than the linear dimensions of the two larger faces.

The transport elements 104 of the apparatus shown in FIGS. 3 and 4 have a structure different from the transport elements 4 of the apparatus 1 shown in FIGS. 1 and 2. Each transport element 104 is delimited by a flat transport surface 22, to which the larger face of the dose 106 opposite that intended to make contact with the receiving surface 21 adheres.

Each transport element 104, in addition to being movable along the trajectory T, as previously described with reference to FIG. 1, is rotatable about an axis R of an arm 23 to which the transport element 104 is connected. In this way the transport element 104, in addition to conveying the dose 106 from the extruder towards the mould 105, can rotate the dose 106 from an initial configuration, which the dose 106 had at the extruder outlet and which may be substantially vertical, or inclined relative to a vertical direction, to a final configuration which is substantially horizontal, in which the dose 106 is released onto the male part 109 of the mould 105.

The transport element 104 has a cutting edge 24 by means of which the continuous extrudate coming out of the extruder can be cut, when the transport element 104 passes near the outlet, for separating the dose 106 therefrom. Therefore, the cutting edge 24 has the function of a separating element for separating the dose 106 from the polymeric material coming out of the extruder.

The transport element 104 is arranged for depositing the dose 106 on the receiving part of the mould 105, that is to say on the male part 109, when the mould 105 is in the open position. For simplicity, the female part 108 has not been shown in FIG. 3.

After the dose 106 has been released onto the male part 109, the transport element 104 moves away from the mould 105, by moving along the trajectory T. The male part 109 and the female part 108 move relative to each other until they are in the closed position, in which the desired object is formed between the male part 109 and the female part 108.

The male part 109 and the female part 108 are supported by a supporting structure 25 which, in the example shown, is a body of the moulding carousel 7.

The apparatus further comprises a thermal conditioning device 111 for thermally conditioning the dose 106 after the dose 106 has been rested on the receiving part, that is to say, on the male part 109, and before the mould 105 reaches the closed position.

The thermal conditioning device 111 comprises a heating element which, in the example shown, includes a laser source 26 suitable for emitting a laser beam 27 having an appropriate wavelength.

A system of mirrors 28 is furthermore provided for diverting the laser beam 27 so as to direct it onto the dose 106. In the example shown, the system of mirrors 28 has been depicted as positioned outside the laser source 26, but this condition is not necessary. The system of mirrors 28 could also be included in the laser source 26.

The laser beam 27 is arranged for being directed onto a surface portion 120 of the dose 106, the surface portion 120 being distinct from the resting portion 117 at which the dose 106 is resting on the male part 109 of the mould 105.

In the example shown, the surface portion 120 is near an edge of the dose 106, on which the cutting edge 24 of a transport element 104 acted to separate the dose 106 from the continuous extrudate. Due to contact with the cutting edge 24, the polymeric material which forms the dose 106 cooled. In some cases, the polymeric material of which the dose 106 consists, which is very thin near the edge on which the cutting edge 24 acted, may have hardened even to the point of locally solidifying.

The laser beam 27 allows heating of the polymeric material of which the dose 106 consists near, or at, the edge on which the cutting edge 24 acted. In this way it is possible to soften the polymeric material which previously hardened, so as to avoid the material crystalizing or in any case solidifying too early in the mould 105, which could cause defects on the formed object.

Alternatively to the above, or in addition to the above, the surface portion 120 which the laser beam 27 allows heating of may be located on the face of the dose 106 which is opposite that in contact with the receiving surface 21 of the male part 109, that is to say, on the face of the dose 106 which was in contact with the transport surface 22 of the transport element 104 during conveying. Indeed, this face of the dose 106 may also have cooled due to contact with the transport element 104.

In the apparatus shown in FIGS. 3 and 4, it is possible to precisely identify the surface portions of the dose 106 which interacted with the transport element 104 and/or with the cutting edge 24.

Consequently, the laser beam 27 may be precisely directed onto the surface portions of the dose 106 which actually cooled during cutting and/or conveying of the dose 106, so as to effectively heat those portions. That is to say, the laser beam 27 may transfer heat locally, and in a targeted way, to the surface portions of the dose which previously cooled the most and which therefore could flow in a non-homogeneous way during filling of the mould 105 or cause surface defects on the formed object.

In the example shown, after the dose 106 has been rested on the receiving part of the mould 105, the dose 106 is moved along the path P. It may also happen that, in order to bring the mould 105 from the open position to the closed position, the receiving part on which the dose 106 is resting (that is to say, in the example shown, the male part 109) moves towards the other part of the mould 105 (that is to say, in the example shown, the female part 108).

In the example shown, the laser source 26 is mounted on the supporting structure 25 which supports the mould 105. The supporting structure 25 is configured to move also the laser source 26 along the path P.

The system of mirrors 28 is configured to displace the laser beam 27 in such a way that the laser beam 27 follows the movement of the dose 106 when the latter is brought by the male part 109 towards the female part 108. The system of mirrors 28 is furthermore configured to displace the laser beam 27 along the surface portion 120 of the dose 106, in such a way that the laser beam 27 heats a surface portion 120 which is not dot-like, but has a predetermined surface extent. The laser beam 27 is therefore rendered capable of "brushing" the surface portion 120 of the dose 106 which came into contact with the cutting edge 24 and/or with the transport surface 22.

During operation, after the dose 106 has been released onto the male part 109 of the mould 105 in the open position of the mould 105, the laser source 26 is activated so that it emits the laser beam 27. The latter interacts with the dose 106 resting on the receiving part of the mould 105 before the mould 105 reaches the closed position. In particular, the laser beam 27 is directed onto the edge of the dose 106 at which the dose 106 was separated from the continuous extrudate, and/or onto the face of the dose 106 opposite the resting surface 117, so as to heat the surface portion 120 of the dose 106 which cooled the most during the cutting and/or during conveying.

The shape of the mould 105 makes use of the laser beam 27 for heating the surface portion of the dose 106 particularly easy. Indeed, since the dose 106 is resting on the male part 109, there are no portions of the receiving part which could obstruct the laser beam 27, as in contrast could occur if the dose 106 were received in the cavity of a female mould part.

Figure 5:
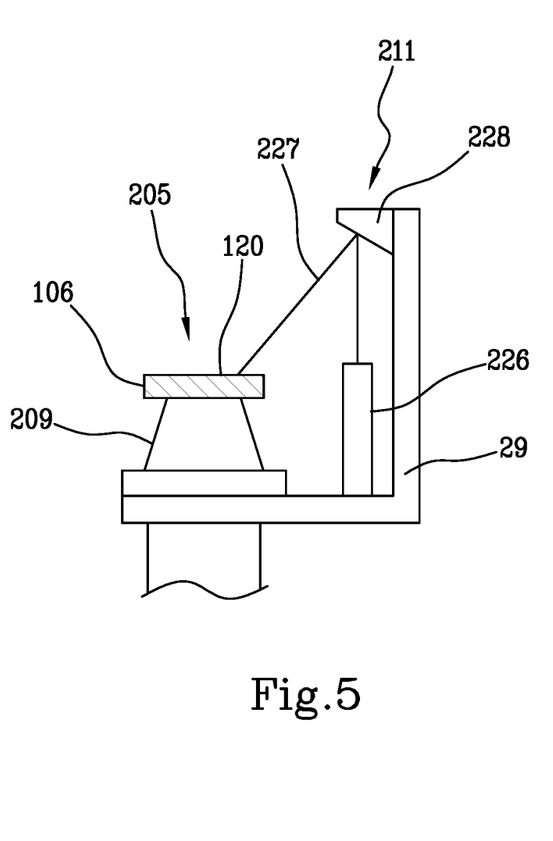
FIG. 5 is a schematic view like that of FIG. 4, showing a heating element according to an alternative embodiment.

FIG. 5 partly shows a mould 205 according to an alternative embodiment, which differs from the embodiment shown in FIGS. 3 and 4 because it is associated with a thermal conditioning device 211 comprising a laser source 226 arranged in a fixed position relative to a male part 209 of the mould 205.

In particular, a supporting element 29 is provided, which is fixed relative to the male part 209 and which supports the laser source 226 and if necessary also a system of mirrors 228 for diverting a laser beam 227 emitted by the laser source 226 towards the dose 106.

If the male part 209 is movable along the moulding direction for moving away from, or towards, the corresponding female part, the laser source 226 moves together with the male part 209. Therefore, the laser beam 227 needs only to be moved so as to reach the desired points of the surface portion 120 of the dose 106 to which heat is to be transferred. In other words, in the embodiment in FIG. 5 the laser beam 227 only performs a movement scanning the points of the surface portion 120 of the dose 106 to be heated. In contrast, there is no need to provide a movement following the male part 209 while the latter moves towards the corresponding female part.

Figure 6:
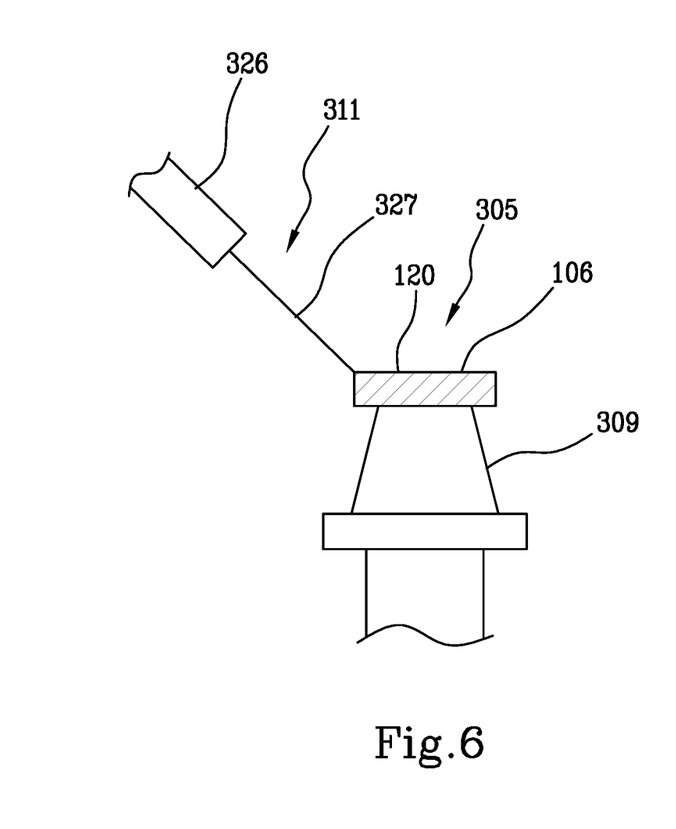
FIG. 6 is a schematic view like that of FIG. 5, showing a heating element according to another alternative embodiment.

FIG. 6 partly shows a mould 305 according to an alternative embodiment, which differs from the mould shown in FIGS. 3 and 4 because it is associated with a thermal conditioning device 311 comprising a laser source 326 arranged in a fixed position on the apparatus to which the mould 305 belongs.

The laser source 326 is configured to displace the laser beam 327 according to three movements, that is to say:
- a movement following the dose 106 while the latter is conveyed along the path P which the moulds 305 travel;
- a further movement following the dose 106 while the latter is moved towards the female mould part by the male part 309;
- a scanning movement for transferring heat to all of the points of the surface portion 120 of the dose 106 to be heated.

The thermal conditioning devices 211, 311 shown in FIG. 5 and respectively 6 operate in the same ways previously described with reference to FIGS. 3 and 4 and in particular allow heat to be transferred to an edge of the dose 106, at which the dose 106 interacted with a separating element for being separated from the continuous extrudate, or to a surface of the dose 106 which came into contact with a transport element.

The solutions shown in FIGS. 3, 4 and 5 use a laser source for each mould, whilst the solution shown in FIG. 6 uses a single laser source for all of the moulds or for a group of moulds. Therefore, the solution shown in FIG. 6 requires a smaller number of components and a smaller number of laser sources compared with the solutions shown in FIGS. 3 to 5. However, in the solutions shown in FIGS. 3 to 5, it is easier to control the movement of the laser beam.

Figure 7:
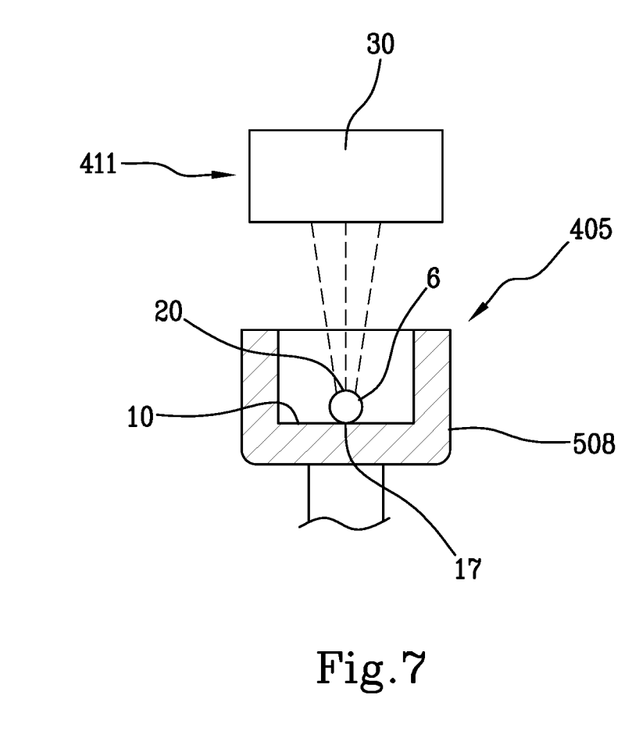
FIG. 7 is a schematic view, showing a female mould part of an alternative embodiment of the apparatus of FIG. 1, wherein a heating element is provided.

FIG. 7 partly shows a mould 405 according to an alternative embodiment. The mould 405 is similar to the mould 5 shown in FIGS. 1 and 2, and comprises a female part 508 positioned below the male part, the female part 508 being provided with a cavity 10 facing upwards.

In the cavity 10 is the dose 6, which has been deposited for example by a transport element of the type shown in FIG. 1. The dose 6 is resting on the female part 508 at a resting portion 17 of the dose.

A thermal conditioning device 411 is furthermore provided which comprises a hot air source 30 arranged for thermally conditioning a surface portion 20 of the dose 6. The surface portion 20 is distinct from the resting portion 17 arranged in contact with the female part 508. The surface portion 20 is exposed to the air, when the mould 405 is in the open position.

The hot air source 30 is positioned along the path P of the moulds 405, in a region of that path in which the dose 6 has already been deposited in the cavity 10, but the mould 405 has not yet reached the closed position.

The hot air source 30 emits hot air which allows heating of the surface portion 20 of the dose 6, in particular at the points at which the dose 6 interacted with the separating element and/or with the transport element. That allows the temperature distribution in the whole dose and in particular on the surface of the latter to be rendered more homogeneous, consequently improving the quality of the formed object.

In place of the hot air source 30, it is possible to provide a flame-treatment unit, one or more infrared ray lamps, a plasma device, or other heat sources.

The features of the embodiments described above with reference to FIGS. 1 to 7 may also be combined differently to what is explicitly mentioned. For example, the containment structure 12 described with reference to FIGS. 1 and 2 or the hot air source 30 described with reference to FIG. 7 may also be used in apparatuses in which the male mould part is positioned below the female mould part. Similarly, the laser source shown in FIGS. 4 to 6 may also be used in combination with a mould in which the female part is positioned below the male part.

The thermal conditioning device may be of the static type, as in the example in FIGS. 1 and 7, in which case the thermal conditioning device is arranged in a fixed position and heats a predetermined zone of the path of the moulds. Alternatively, the thermal conditioning device may be of the dynamic type, as in the example in FIGS. 4 to 6, in which the thermal conditioning device allows different points of the dose to be heated in sequence.

In the description above, reference was made to an apparatus comprising a plurality of moulds mounted in a peripheral region of a moulding carousel, the moulding carousel being rotatable about an axis thereof.

However, what is described above with reference to the thermal conditioning device and to the heating of the dose in the mould may also apply to an apparatus comprising only one mould, rather than a plurality of moulds.

Moreover, the mould or the moulds may be movable along a path which is not necessarily circular, for example a generic path closed in a loop or a linear path.

The conveying device comprising the transport elements which bring the dose from the extruder to the moulds is not indispensable, but could be unnecessary if an arrangement of the extruder and moulds were adopted which is different from that described above.

The dose may be separated from the continuous extrudate not only by means of a separating element mounted on the transport element, but also by means of a separating element which is distinct from any transport elements, for example a blade or a laser beam interposed between the extruder and the transport device.

The female mould part and the male mould part may be substituted by a generic first mould part and by a generic second mould part, that is to say, by mould parts which do not have a punch and/or a cavity, if the object to be obtained does not have a concave shape.

In the description above, reference was always made to a thermal conditioning device positioned along the path of the moulds.

More specifically, the thermal conditioning device may be provided at a location along the path of the mould. This location may be interposed between a point of the path in which the receiving part of a mould receives the dose and a further point of the path in which the mould reaches the closed position. This is the case, for example, of the thermal conditioning device shown in FIG. 7.

As a particular case of the situation referred to above, the location of the thermal conditioning device may extend from the point of the path in which the receiving part of a mould receives the dose up to the further point of the path in which the mould reaches the closed position, as shown in FIGS. 1 and 2.

It may also happen that the thermal conditioning device, independently of its location, is activated when the mould is in a portion of the path thereof interposed between the point in which the receiving part of the mould receives the dose and the further point of the path in which the mould reaches the closed position. This may occur, for example, if the thermal conditioning device is movable along the path of the mould together with the mould or a part thereof, as shown in FIGS. 3, 4 and 5, or if the thermal conditioning device is located in a stationary position, as may occur in the embodiment of FIG. 6.

Activation of the thermal conditioning device may occur, for example, by generating a laser beam or any by activating heat generation by any other heat source included in the thermal conditioning device.

These are examples of cases in which the thermal conditioning device is configured to act on the dose while the dose is positioned in the mould and before the closed position is reached.

In addition or alternatively to what is described above, it is possible to provide a thermal conditioning device positioned upstream of the moulds, acting on the dose before the latter rests on the receiving part of the mould.

In this case, the thermal conditioning device may comprise a localized heat source, suitable for directing thermal energy onto a selected surface portion of the dose.

The localized heat source may be a laser source, or an infrared ray lamp, or a flame-treatment unit, or a plasma device, or the like.

For example, as shown in FIG. 1, it is possible to provide a localized heat source comprising a laser source 511, positioned at a predetermined point along the trajectory T of the transport elements 4.

The laser source 511 is positioned in such a way as to direct a laser beam onto a surface portion of the dose 6 which is exposed to the air, that is to say, not adhering to the corresponding transport element 4. The laser beam may be moved with a scanning movement so as to heat a predetermined area of the surface portion of the dose.

In this way it is possible to produce heating of the dose, which is thermally more homogeneous and allows good quality objects to be obtained.

The localized heat source may also be used in combination with transport elements different from those shown in FIG. 1, for example transport elements of the type shown in FIG. 3, or with mutual arrangements of the female mould part and of the male mould which are different from that shown in FIG. 1, for example wherein the male mould part is positioned below the female mould part.

It is also possible to position the localized heat source at a different point of the path of the doses, for example in a zone in which the dose is released onto the receiving part of the mould. For example, the localized heat source could be configured to direct thermal energy onto the dose while the latter descends towards the receiving part of the mould.

More generally, the thermal conditioning device may therefore be positioned at any point of a path followed by the dose, starting from the moment when the dose is cut from the continuous extrudate, until the moment when the mould, into which the dose has been inserted, reaches the closed position.

To summarise, a method for forming an object comprises the steps of:
supplying a continuous extrudate of polymeric material,
cutting the continuous extrudate, separating a dose (6; 106) of polymeric material therefrom,
providing at least one mould (5; 105; 205; 305; 405) comprising a first mould part (9; 109; 209; 309) and a second mould part (8; 108, 508);
positioning the dose (6; 106) on a receiving part selected from the first mould part (9; 109; 209; 309) and the second mould part (8; 108; 508), while the first mould part (9; 109; 209; 309) and the second mould part (8; 108; 508) are at a distance from each other;
moving the first mould part (9; 109; 209; 309) and the second mould part (8; 108; 508) relative to each other until a closed position is reached, in which a forming chamber is defined between the first mould part (9; 109; 209; 309) and the second mould part (8; 108; 508), the forming chamber having a shape corresponding to said object,
wherein, before reaching the closed position, there is provided directing thermal energy emitted by a localized heat source (511) onto a surface portion of the dose (6; 106).

In one embodiment, the surface portion (20; 120) of the dose (6; 106) which is thermally conditioned interacted with a separating element during the step of cutting the continuous extrudate for separating the dose (6; 106) therefrom.

An apparatus for forming an object comprises an extruding device (2) for supplying a continuous extrudate of polymeric material, at least one separating element for cutting the continuous extrudate separating therefrom a dose (6; 106) of polymeric material, at least one mould (5; 105; 205; 305; 405) comprising a first mould part (9; 109; 209; 309) and a second mould part (8; 108; 508) which are movable relative to one another between an open position, in which the dose (6; 106) is rested on a receiving part selected from the first mould part (9; 109; 209; 309) and the second mould part (8; 108; 508), and a closed position, in which a forming chamber is defined between the first mould part (9; 109; 209; 309) and the second mould part (8; 108; 508), the forming chamber having a shape corresponding to said object, wherein the apparatus further comprises a localized heat source (511) for directing thermal energy onto a selected portion of the dose (6: 106) before the dose (6; 106) is deformed between the first mould part (9; 109; 209; 309) and the second mould part (8; 108; 508).

In one embodiment, the apparatus further comprises at least one transport element (4; 104) movable along a trajectory (T) for conveying the dose (6; 106) towards said at least one mould (5; 105; 205; 305; 405), the localized heat source (511) being positioned at a point of the trajectory (T) so as to direct heat onto a portion of the dose (6; 106) not in contact with the transport element (4; 104) while the dose (6; 106) is associated with the transport element (4; 104).

In one embodiment, the localized heat source (511) is positioned in such a way as to transfer heat to the dose (6; 106) while the dose (6; 106) is descending onto the receiving part.

In one embodiment, the localized heat source (511) is selected from a group comprising: a laser source, a flame-treatment unit, an infrared ray lamp, a plasma device.

The invention claimed is:

1. Apparatus for forming an object, comprising an extruding device for supplying a continuous extrudate of polymeric material, at least one separating element for cutting the continuous extrudate thereby separating from the continuous extrudate a dose of polymeric material, the apparatus including at least one mould movable along a path and at least one transport element movable along a trajectory for conveying the dose from the extruding device towards the mould, the trajectory being in the form of a closed loop, with said trajectory and said path intersecting in a common releasing portion where the transport element releases the dose on a receiving part of said mould, the mould comprising a first mould part and a second mould part aligned with each other along a moulding direction, the first mould part and the second mould part being movable relative to one another between an open position, in which the dose is rested on said receiving part selected from the first mould part and the second mould part, and a closed position, in which a forming chamber is defined between the first mould part and the second mould part, the forming chamber having a shape corresponding to said object, wherein the apparatus further comprises a thermal conditioning device different from the transport element, and wherein the thermal conditioning device is at least partly active along the path operatively downstream of the releasing portion to act on the dose while the dose is interposed between the first mould part and the second mould part, after the dose has been released into said at least one mould and before the closed position is reached, by thermally conditioning at least one surface portion of the dose which is distinct from a resting portion of the dose which is resting on the receiving part.

2. Apparatus according to claim 1, wherein the thermal conditioning device is located along a path of said at least one mould, in a position interposed between a point of the path in which the receiving part receives the dose and a further point of the path in which said at least one mould reaches the closed position.

3. Apparatus according to claim 2, wherein the thermal conditioning device extends from the point of the path in which the receiving part receives the dose up to the further point of the path in which said at least one mould reaches the closed position.

4. Apparatus according to claim 1, wherein the thermal conditioning device is adapted to be activated in a position of a path of said at least one mould interposed between a point of the path in which the receiving part receives the dose and a further point of the path in which said at least one mould reaches the closed position.

5. Apparatus according to claim 1, wherein the thermal conditioning device is positioned outside the receiving part.

6. Apparatus according to claim 1, wherein the thermal conditioning device comprises a laser source for emitting a laser beam intended to be directed onto the surface portion of the dose.

7. Apparatus according to claim 6, wherein the laser source is configured to move the laser beam so that the laser beam scans a plurality of points of the surface portion of the dose.

8. Apparatus according to claim 6, wherein the laser source is positioned in a fixed position, said at least one mould being movable relative to the laser source.

9. Apparatus according to claim 1, wherein the thermal conditioning device comprises a heat source positioned along a path along which the mould is movable, the heat source being interposed between a point of said path at which the open position is reachable and a further point of said path at which the closed position is reachable.

10. Apparatus according to claim 9, wherein the heat source is selected in a group comprising: a hot air source, a flame-treatment unit, an infrared ray lamp, a plasma device.

11. Apparatus according to claim 1, and further comprising a movement device for displacing the mould along a path, the thermal conditioning device comprising a containment structure, positioned in a zone of said path interposed between a point of said path at which the open position is reachable and a further point of said path at which the closed position is reachable, for limiting heat dispersion towards the outside.

12. Apparatus according to claim 11, and further comprising a heating element for heating the air inside the containment structure.

13. Apparatus according to claim 12, wherein the heating element comprises at least one infrared ray lamp positioned inside the containment structure and at least one mirror associated with a wall of the containment structure for directing the infrared rays towards the surface portion of the dose.

14. Apparatus for forming an object, comprising an extruding device for supplying a continuous extrudate of polymeric material, at least one separating element for cutting the continuous extrudate thereby separating from the continuous extrudate a dose of polymeric material, the apparatus including at least one mould movable along a path and at least one transport element movable along a trajectory for conveying the dose from the extruding device towards the mould, the trajectory being in the form of a closed loop, with said trajectory and said path intersecting in a common releasing portion where the transport element releases the dose on a receiving part of said mould, the mould comprising a first mould part and a second mould part aligned with each other along a moulding direction, the first mould part and the second mould part being movable relative to one another between an open position, in which the dose is rested on said receiving part selected from the first mould part and the second mould part, and a closed position, in which a forming chamber is defined between the first mould part and the second mould part, the forming chamber having a shape corresponding to said object, wherein the apparatus further comprises a thermal conditioning device, and wherein the thermal conditioning device is adapted to act on the dose while the dose is interposed between the first mould part and the second mould part, after the dose has been released into said at least one mould and before the closed position is reached, by thermally conditioning at least one surface portion of the dose which is distinct from a resting portion of the dose which is resting on the receiving part, wherein the thermal conditioning device comprises a tubular containment structure which at least partly encloses at least the receiving part of the mould along at least part of said path, said containment structure extending along the path between an entrance opening, through which the receiving part of the moulds enters the containment structure downstream the releasing portion, and an exit opening, through which the receiving part comes out of the containment structure near the point of the path at which the closed position of the mould is reached.

15. Apparatus for forming an object, comprising an extruding device for supplying a continuous extrudate of polymeric material, at least one separating element for cutting the continuous extrudate thereby separating from the continuous extrudate a dose of polymeric material, the apparatus including at least one mould movable along a path and at least one transport element movable along a trajectory for conveying the dose from the extruding device towards the mould, the trajectory being in the form of a closed loop, with said trajectory and said path intersecting in a common releasing portion where the transport element releases the dose on a receiving part of said mould, the mould comprising a first mould part and a second mould part aligned with each other along a moulding direction, the first mould part and the second mould part being movable relative to one another between an open position, in which the dose is rested on said receiving part selected from the first mould part and the second mould part, and a closed position, in which a forming chamber is defined between the first mould part and the second mould part, the forming chamber having a shape corresponding to said object, wherein the apparatus further comprises a thermal conditioning device, and wherein the thermal conditioning device is adapted to act on the dose while the dose is interposed between the first mould part and the second mould part, after the dose has been released into said at least one mould and before the closed position is reached, by thermally conditioning at least one surface portion of the dose which is distinct from a resting portion of the dose which is resting on the receiving part, wherein the thermal conditioning device comprises a localized heat source located and active along the path operatively downstream of the releasing portion for directing thermal energy onto a selected portion of the dose before the dose is deformed between first mould part and the second mould part.

* * * * *